UNITED STATES PATENT OFFICE.

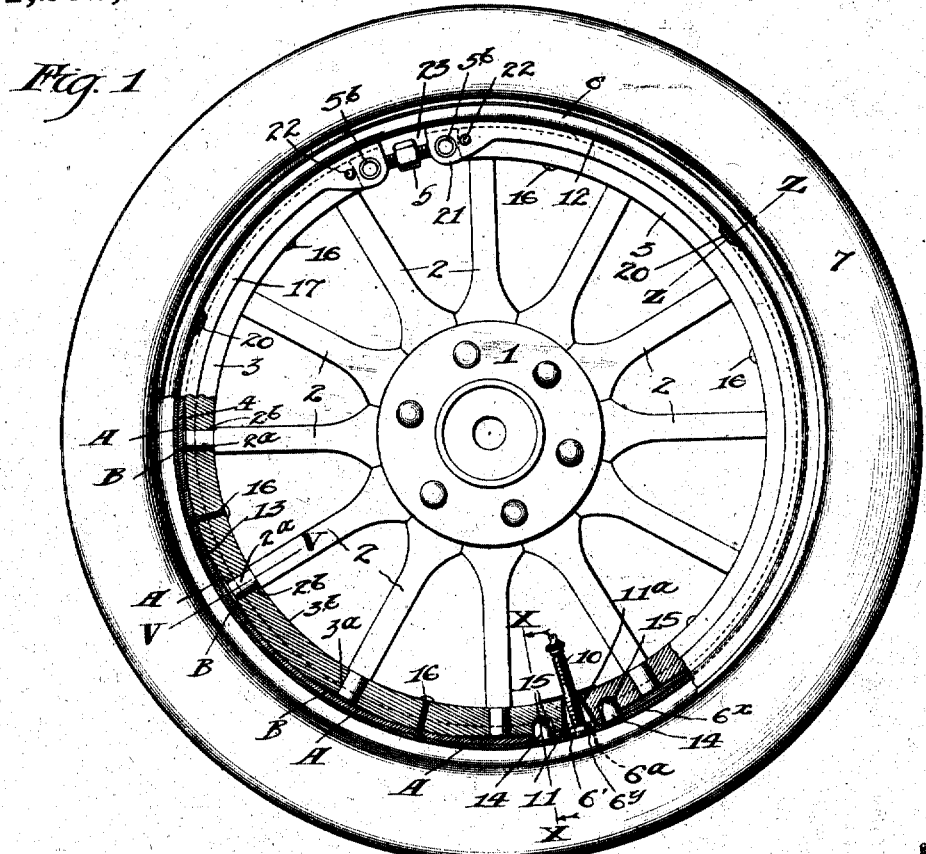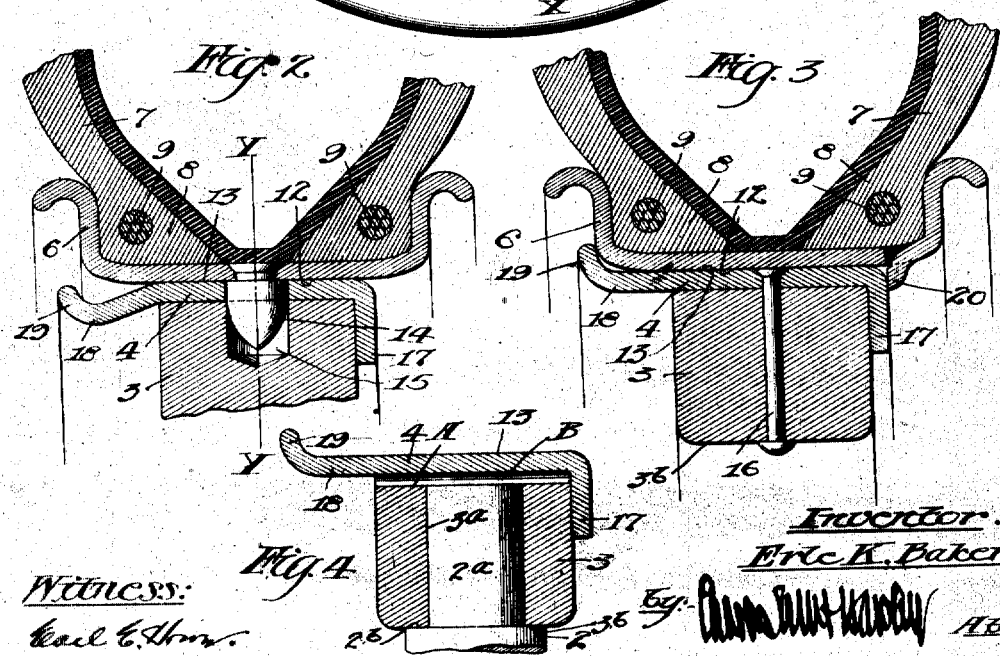

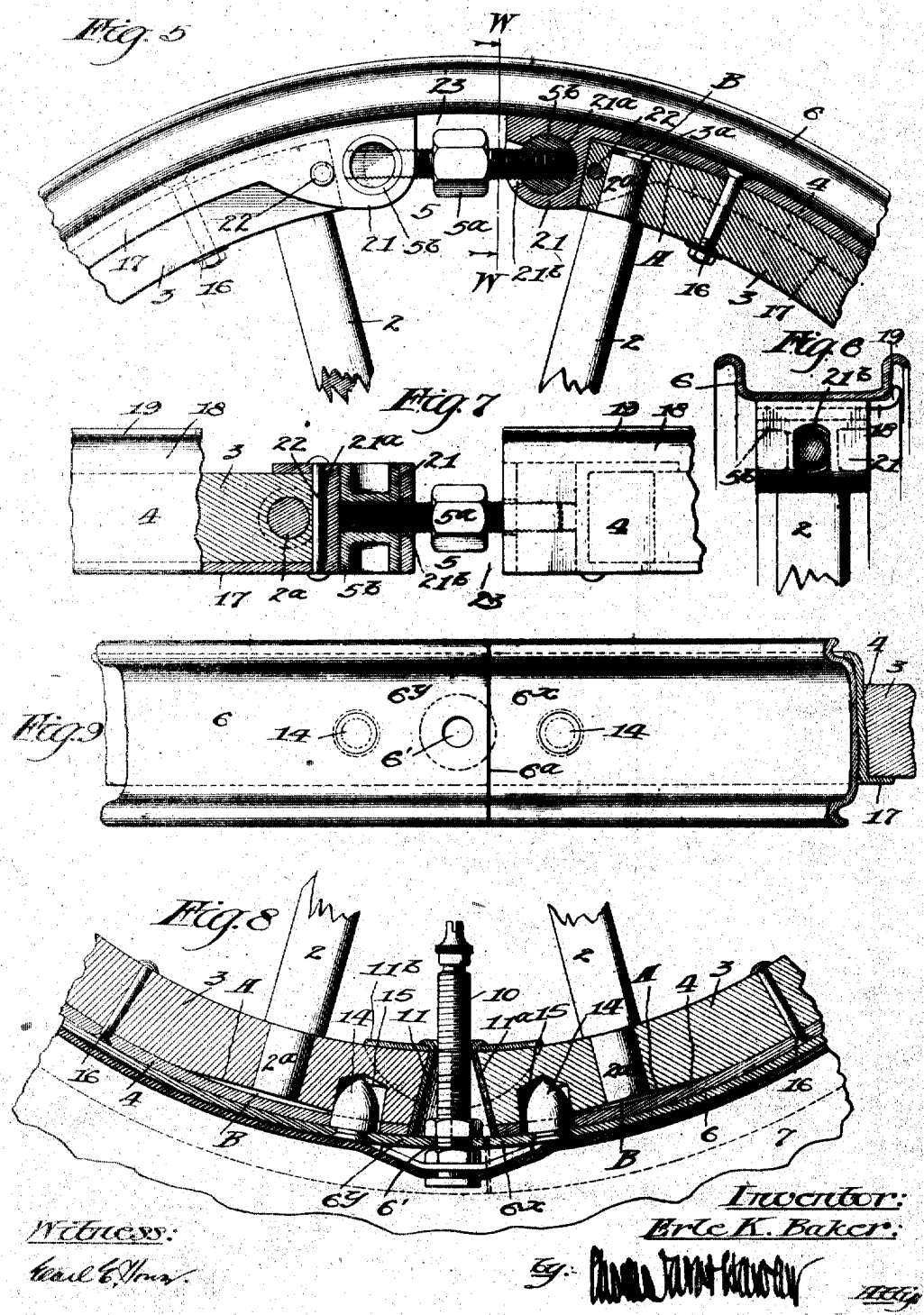

ERLE KING BAKER, OF CHICAGO, ILLINOIS, ASSIGNOR, BY MESNE ASSIGNMENTS, TO BAKER WHEEL & RIM COMPANY, OF CHICAGO, ILLINOIS, A CORPORATION OF ILLINOIS.

RIM-DEMOUNTING WHEEL FOR MOTOR-VEHICLES.

1,282,362.      Specification of Letters Patent.     Patented Oct. 22, 1918.

Application filed March 25, 1916. Serial No. 86,599.

*To all whom it may concern:*

Be it known that I, ERLE KING BAKER, a citizen of the United States, residing at Chicago, Cook county, Illinois, have invented certain new and useful Improvements in Rim-Demounting Wheels for Motor-Vehicles, of which the following is a specification.

My invention relates to demountable rim constructions for motor vehicle wheels which are equipped with tires that require changing from time to time.

It is the usual practice to put a pneumatic tire upon a demountable rim, and there inflate it before mounting the rim on the wheel of the motor vehicle. In event the tire is injured or deflated, the rim is demounted, and replaced by another bearing an inflated tire; and the detaching of the injured tire from its rim, as well as the repairing of the tire, may be postponed.

The general objects of my invention will be made clear by the following statement of the problems and needs presented by the above defined practice.

The construction of a pneumatic tire is such that it does not lend itself to ready adjustment upon a rim or wheel. The rim should be so made that it will be easy to attach and detach the tire, and the rim must be capable of safely and securely holding the tire, whether in service on the wheel or being carried as an inflated "spare." Either the rim construction or the wheel construction should be such that it will be easy to both mount and demount the rim with its tire (whether inflated or deflated) and at the same time provide for the secure and dependable holding of the rim and tire against movement on the wheel during service. The true circular form of the tire and rim should be constantly maintained. The tire should be held truly perpendicular to the axis of the wheel. The distortion of either the rim or the tire should be avoided. The concentricity of the tire and rim with respect to the axis of the wheel should be positively insured and constantly maintained. Unless the demounting means responds to the above requirements the structure cannot be pronounced safe or desirable, and if the circularity, concentricity and perpendicularity of the tire are not maintained, it will be found that the life of the tire is materially shortened. In addition to these requirements, it is essential that the construction shall be of the least weight consistent with the service to be performed, and it is commercially necessary that the cost of both manufacture and maintenance shall be low. It is also extremely desirable that the construction shall be such that the rim may be mounted and demounted by the operation of a minimum number of parts and in the shortest possible time.

For use with standard clencher tires which have base beads that may be stretched over its flanges, the rim may be of the integrally flanged endless type, and, to that extent, simpler than those required for tires having non-stretchable base beads. But in all other respects, the problem remains the same; for the matters of demountability, security, non-distortion, circularity, concentricity and perpendicularity are of equal importance as to all tires.

The specific object of my invention is to provide a rim demounting wheel construction which shall be applicable to rims and tires of all types and which shall provide the complete solution of all of the above stated problems.

The general nature and principles of my invention, and also the details of the best embodiment thereof that I have thus far devised, will be readily understood on reference to the drawings that form part of this specification, and are particularly pointed out in the appended claims. Primarily, my invention consists in a wheel which may be contracted to free the rim; and expanded, to secure the same in place. The demountable rim used in connection with this wheel may be of any kind adapted to withstand the expanding force of the wheel. By preference, I use an endless clencher rim for standard clencher tires and "Baker type" transplit rims for tires which have inextensible base beads.

In said drawings:—Figure 1 is an outer side elevation of a rim demounting wheel embodying my invention, the same being fully equipped with a transplit rim and pneumatic tire; and portions of the wheel and rim being shown in section to disclose the means by which the action of the wheel spokes is compensated by the action of the wheel felly at the time the latter is contracted to free the rim;—Fig. 2 is a full sized section on the line X—X of Fig. 1;—Fig. 3 is a like section on the line Z—Z of Fig. 1;—Fig. 4 is another section on the line V—V of Fig. 1, omitting the rim and tire;—Fig. 5 is a side view, enlarged from Fig. 1, showing the details of the felly-expanding-and-contracting device;—Fig. 6 is a section on the line W—W of Fig. 5;—Fig. 7 is a sectional plan view disclosing further details of the parts appearing in Fig. 5;—Fig. 8 is an enlarged detail of the parts adjacent the valve stem, enlarged from Fig. 1, the section being on the line Y—Y of Fig. 2;—and Fig. 9 is a plan view from beneath Fig. 8, the tire and its valve stem being omitted.

Others have preceded me in procuring patents upon wheels of this class, and I do not claim to be the first to invent a wheel of the variable-circumference type used as the means of mounting and demounting a tire-carrying rim. In itself that idea is very old. But, on the other hand, it appears never to have been reduced to a form admitting of its practical use. This application deals with an improvement by which the clearly apparent merits and advantages of such a structure are made available. In every such wheel the felly is contracted to reduce its circumference and thus free the demountable rim. In the past every arrangement of spokes and felly which has permitted the contraction of the felly has left the spokes loose upon the expansion of the felly within the rim. As known to every wheelwright a wheel in which the spokes are loose cannot safely be used and this is especially true in the case of powerful, fast-moving motor vehicles. The use of manually adjustable tightening devices between the spokes and felly has been suggested as a means of compensating for the shortness of the spokes when the felly is expanded; but if anything of the kind were to be used, it would be preferable to make the wheel felly and its fixed rim in the ordinary endless form and to place the adjusting devices between the wheel periphery and the rim; or, to make the rim itself expansible and contractible. Both expedients have been used in the past. The special purpose of the present invention is to avoid all such expedients and resulting complications by providing a wheel upon which the rim may be directly mounted and which shall be of such construction that it shall, within itself, automatically compensate for the changes of circumference in the wheel felly, and whereby a single adjusting device shall be made to take the place of the many adjustments required in the demountable rim constructions, previously invented.

Referring again to the drawings, it will be seen that the complete structure comprises a hub, 1,—radial spokes, 2,—a circular felly, 3, and its fixed rim, 4,—a felly expander, 5—a demountable rim. 6,—and a tire or shoe, 7.

When the wheel and rim are assembled, as shown, the rim, and the tire which it carries, are concentric with the axis of the wheel hub; and also in a plane perpendicular to said axis. Obviously, the circular form of the wheel is directly imparted to the rim and the tire.

The rim, 6, may be of any desired cross-section, as before explained, according to the cross-section of the tire to be used thereon. I have shown an integrally-flanged straight-side rim of the "Baker" type most popular at the present time. As indicated by the line, $6^a$, in Fig. 9, the rim is transplit so that it may be put into and taken out of a pneumatic tire which has inextensible base beads, typically represented in Figs. 2 and 3, in which 8, 8, are base beads rendered inextensible by intermolded endless cables, 9. When the rim is of the "Baker" type, the valve stem, 10, of the tire is positioned adjacent the transverse split, $6^a$. The valve stem is accommodated by a hole, 11, in the fixed rim and felly. Whether the rim is endless or transplit, I provide a driving connection between the inner periphery, 12, of the demountable rim and the outer periphery, 13, of the fixed rim. This driving connection preferably takes the form of two inwardly extending studs, 14, 14, riveted in the demountable rim and extending into sockets, 15, in the fixed rim, 4, and felly, 3. These driving studs are placed near the valve stem hole, 6', in the rim; and in the case of a transplit rim there is one said stud on each rim end, $6^x$, $6^y$, and in that case they coact with the embraced portion of the fixed rim, 4, to positively, though detachably, connect or tie them together, so that the rim, 6, shall not be distended by the expanding force of the wheel on which it is positioned. The valve stem, 10, and the driving studs, 14, in coaction with the fixed rim, provide a temporary hinge or pivot between the rim and the wheel when the rim is being buttoned upon, and unbuttoned from, the wheel.

I have first explained the details of the rim construction in order that it may be understood that in mounting and demounting the rim the user goes through the same operations as in the case of the ordinary "Continental" wheel and rim structure. But, as about to be explained, the actual operation of fastening the rim on the wheel is greatly simplified when the wheel is of the form herein shown and described.

It will be understood that the rim can be neither mounted nor demounted from the wheel until the latter is sufficiently reduced in circumference to permit the rim to be swung or buttoned into position with the valve stem as the pivot point. It will be obvious that a smaller reduction of the circumference of the wheel would be sufficient if the valve stem construction were of a kind to permit the rim to be slid into place on the wheel, i. e., if the wheel felly were notched or if the valve stem projected laterally from the tire; but both of these substitutes for the construction illustrated are obsolete, and it is unnecessary to further consider them in this case.

The fixed rim, 4, is preferably secured to the wooden felly, 3, by means of the usual tire bolts or rivets, 16. It is formed to receive and fit the inner periphery, 12, of the demountable rim; that is, the fixed rim is mainly cylindrical. The outer edge of the fixed rim is turned inwardly and forms a stop flange, 17, which faces the outer side of the wooden felly, 3. The fixed rim is preferably of greater width than the felly, 3, and overhangs the inner side thereof. Its overhanging portion, 18, is provided with an outwardly turned flange, which forms an annular stop or fixed rib, 19, against which the demountable rim, 6, is placed. In the region of the valve stem, 10, I prefer to bend the portion, 18, inwardly, and thus reduce the effective width of the fixed rim at that point. This narrowed formation is shown in Fig. 2; and by means thereof the rim, 6, is allowed to "button on" to the wheel with less clearance between the rim and wheel at the point diametrically opposite the valve stem. The fixed rim is preferably rolled from relatively thin sheet steel, and, by providing it with the flanges, 17, 18, and 19, I make it strong enough to resist the stretching force of the expander device, 5, when the latter is used to contract the felly.

In addition to the stop rib, 19, or as a substitute therefor, I may provide the rim 6, with inwardly projecting stop lugs, 20, as shown in Figs. 1, and 3. Two of these studs placed in 120-degree positions with respect to the valve stem, 10, are sufficient; but their number may be increased at will. I prefer to form the studs, 20, by punching and shearing the body of the rim adjacent the flange thereof, as shown in Fig. 3. As between the two stops, 19, and, 20, I prefer the annular rib, 19, particularly as by discarding the lugs, 20, the rim, 6, may be put on either side to the wheel, i. e., is made reversible on the wheel.

As a rule the felly, 3, is made in two halves, the ends of which meet at the valve-stem hole, 11. To hold the abutting ends in alinement and protect the end-wood, I employ a conical bushing, 11ª, in the valve stem hole, 11. This bushing is inserted and then its inner end is rolled or flanged over the saddle-plate, 11ᵇ, as best shown in Fig. 8.

The opposite ends of the felly are in abutment with projections, 21, formed on the ends of the fixed rim, 4. They may be held in that relation by cross rivets, 22. The adjacent projections, 21, form the felly gap or space, 23, which accommodates the expander, 5. Most conveniently, the expander comprises a right and left threaded screw, having a polygonal part, 5ª, to which a wrench may be applied. The ends of the screw are held in cylindrical nuts, 5ᵇ, which in turn are rotatably held in transverse bores, 21ª, therefor in the projections, 21. Slots, 21ᵇ, in the projections permit relative movement between the same and the screw, as the expander is operated. By this construction the expander is allowed to act without binding the screw threads, as would be the case if the screws were threaded directly into the projection or lugs, 21.

It will now be understood that the fixed rim and the wooden felly are fastened together and in any case must move together when the expander is operated. By turning the expander in one direction the fixed rim ends are drawn together and obviously the circumference of the wheel is thus so reduced that the rim, 6, may freely be mounted on or demounted from the wheel. On the turning of the expander screw, 5, in the other direction the ends of the fixed rim are forced apart at the felly gap, 23. Obviously, at such time the periphery of the wheel is forced outward and strongly into engagement with the inner periphery of the rim, and thereby the rim is firmly seated and held on the wheel. It should be understood that the construction of the expanding and contracting device may be varied at the will of the designer, and, while the particular device here shown is novel, my invention is not restricted thereto.

The structural details thus far described are admirable as far as concerns the duties to be performed by the several parts; but I must frankly state that a wheel constructed as above set forth would not be a practical article, nor of any great merit, except for the presence of the further feature which I shall now describe.

As in wheels of ordinary construction, the outer ends, 2ª, of the spokes, 2, are tenons, which snugly fit holes or mortises, 3ª, in the wooden felly, 3. Each spoke, 2, has an abutment shoulder, 2ᵇ, which presses against the inner periphery, 3ᵇ, of the felly. These shoulders serve to fix the distance between the felly and the wheel center. The wooden spokes are capable of withstanding great pressure in the direction of their respective axes; and reversely, are capable of exerting their full thrust against the felly when an attempt is made to force the latter inward toward the wheel center as must always be the case when the felly is contracted by means, such as the device, 5. In the past, the only way in which the felly has been allowed to move inwardly at such time has been to cut back the shoulders, 2ᵇ, of the spokes; or to depend upon the "burying"

thereof in the wooden felly. The latter is wholly impracticable, because the tough wood is practically incompressible, and the cutting back of the shoulders obviously allows objectionable lost-motion between the spokes and the felly, whenever the felly is circumferentially enlarged or expanded.

I have successfully obviated the difficulty by cutting away the felly beneath the fixed rim at each spoke end, and thus making the felly to act as a resilient leaf spring between each spoke and the fixed rim. Hereafter I shall refer to the cutting away of the wooden felly as the "slabbing" of a segment thereof opposite each spoke end. In practice the spoke end is properly trimmed or finished in the same "slabbing" operation which thins the felly at these points. The slabbed portions of the felly are marked A, in Figs. 1, 4, 5, and 8; and the free or segmental spaces thereby provided between the fixed rim and the felly (and more essentially between felly and the demountable rim) are marked, B, in the drawings.

By constructing the wheel in this manner, the pressure of the fixed rim (whatever its kind) is exerted upon the felly at points midway between the spokes. Both the spokes and those portions of the felly which they directly engage, are permitted to move bodily toward and from the fixed rim, whenever sufficient force is exerted between the same and the hub. After the felly is placed on the spokes, I force or shrink the fixed rim upon the felly; allowing sufficient "draft" to firmly bind them together but not enough to absorb the resilience of the felly, or close the free spaces or segmental openings, B. Thus the wheel as a whole is constantly maintained in a condition of strong compression, which prevents the loosening of its parts. This part of my invention is of general applicability to motor vehicle wheels whether equipped with fixed tire-holding rims or with demountable rims. But the invention finds its greatest utility in resilient-tire-carrying wheels of the variable circumference, or "rim-demounting", type herein illustrated.

In constructing the wheel which is characterized by the open gap in the felly, I find it possible to exert sufficient "draft" upon the fixed rim and felly through the medium of the expanding and contracting device, 5, and may in that manner put the several parts under the degree of compression which is requisite to the normal and stable action of the wheel in service. As before indicated, the normal compression is accomplished without taking up or absorbing the free spaces, B; and therefore, when it becomes necessary to contract the wheel by means of the device, 5, that contraction may take place without doing more than subject the spokes to a slight increase of compression from the felly. It will be understood that the wheel is kept in contracted condition only long enough to demount or mount the tire-carrying rim, and is then expanded to its normal condition. I find that the forces which act during that brief period are in no way detrimental to the spokes or to the wooden felly; on the other hand, the great advantage of maintaining the spokes under compression at all times cannot be overestimated. The contraction which is required to free the demountable rim when of the form illustrated is only a small fraction of an inch measured at the gap, 23; and in practice the spring-spaces, B, may be so minute as hardly to be noticed by a person viewing the wheel from its inner side.

The number of spring or compensating spaces B, may be reduced if some of them are made wider, particularly those opposite the gap, 23, and at the sides of the wheel; and, in many cases it is sufficient to slab the felly at only every other spoke; but the better construction is shown in the drawings, for in that case the contracting and expanding forces are equally distributed upon the spokes and the strength of the wheel is made uniform throughout.

A distinct advantage lies in the fact that the mounting and demounting of the rim is accomplished by the operation of a single operating member, to-wit, the expander, 5. A further advantage flows from the absence of the interlocking parts between the peripheries of the fixed and demountable rims, for this allows the "buttoning on" clearance to be so reduced that the operation is accomplished with very few turns of the expanding device. Another advantage of the invention lies in the arrangement of the transverse split of the demountable rim at a point diametrically opposite the felly-gap, 23; whereby the wheel is kept in balance, and whereby the split portion of each member is reinforced by a continuous portion of the other. And the arrangement is especially desirable because, when the wheel is being expanded within the rim, the frictional grip of the rim on the wheel periphery absorbs most of the strain which would otherwise be directly applied to the interlocking and driving studs, 14, on the rim. The extreme simplicity and low cost of the described rim-demounting wheel will be apparent to all who are skilled in the art; and generally it will be apparent that by means of the described structure, I attain all the primary objects, and fulfil all of the requirements, set forth in the opening paragraphs of this specification.

While I have illustrated and described my invention in accordance with the patent statutes, I desire it to be understood that the details of construction may be materially varied, and that many changes, modifications, and substitutions may be made in the structure herein illustrated, without departing from the spirit and scope of my invention as set forth in the appended claims.

Having thus described my invention, I claim as new and desire to secure by Letters Patent:—

1. The herein described improvement that consists in a variable circumference compression-spoke wheel having compensating spaces between its felly and fixed rim at the ends of several spokes, said fixed rim containing a gap at one place in combination with an expander provided in the gap of said fixed wheel, and a demountable tire-holding-rim on said wheel, said rim being secured upon said fixed rim by the expansion thereof and being freed by the contraction of said fixed rim.

2. The improvement herein described comprising a wheel felly and fixed rim, containing a transverse gap, in combination with an expander for opening and closing said gap, radial spokes whereon said felly is fixed and said felly being slabbed at the ends of said spokes to provide compensating spaces between the felly and said rim.

3. The improvement herein described comprising a variable circumference wheel composed of a felly, in combination with a fixed rim thereon, said rim being wider than the felly and having an annular rib at its inner edge which is bent inwardly adjacent to the valve stem position, to "narrow" the fixed rim at that point, as and for the purpose specified.

4. The improvement herein described comprising a rim demounting wheel containing an expander gap and having a valve stem hole in its fixed rim and felly diametrically opposite said gap, in combination with a tapered bushing in said hole, and a saddle plate secured on the felly by the flanging of the small end of said bushing.

5. In a variable circumference wheel the combination of opposed fixed rim ends, containing cylindrical transverse bores, with cylindrical nuts rotatable in said bores, and an expanding screw having its ends held in said nuts.

6. The improvement herein described in rim demounting wheels, comprising radial spokes, in combination with a felly on the ends thereof, a fixed rim exerting pressure on said felly and said felly being formed to receive the compression of said rim at points between the spokes and being relieved therefrom at the ends of the spokes, substantially as and for the purposes described.

7. The herein described improvement in compression-spoke wheels, that consists in providing the fixed rim with bearings upon the felly at points between the spokes, and with none at the ends of the spokes, substantially as and for the purpose described.

8. The improvement in variable-circumference, rim-demounting wheels, that consists in compensating spaces between the fixed rim and the felly, at the ends of the spokes.

9. A wheel comprising spokes radiating from a center, in combination with a felly encircling the spokes and with which the ends of the spokes are in abutment, a fixed rim mounted on said felly and in pressure-contact therewith at points between the spoke ends, and the felly being inwardly offset from the fixed rim at the spoke ends, whereby the several parts of the felly are made to perform the office of take up springs between the fixed rim and the spokes.

10. The improvement herein described comprising a wheel having a cylindrical fixed rim formed to receive and hold a demountable rim, in combination with a felly which carries said fixed rim, a hub, spokes supporting said felly on said hub, and the outer periphery of said felly being cut away beneath the fixed rim at the ends of the spokes.

In testimony whereof, I have hereunto set my hand this 18th day of March, 1916.

ERLE KING BAKER.